(12) United States Patent
Freisler et al.

(10) Patent No.: US 11,603,064 B2
(45) Date of Patent: Mar. 14, 2023

(54) MODULE BASE ELEMENT FOR A VEHICLE OCCUPANT PROTECTION SYSTEM AND VEHICLE OCCUPANT PROTECTION SYSTEM

(71) Applicant: ZF Automotive Germany GmbH, Alfdorf (DE)

(72) Inventors: Werner Freisler, Schwäbisch Gmünd (DE); Erik Hanle, Überlingen (DE)

(73) Assignee: ZF AUTOMOTIVE GERMANY GMBH, Alfdorf (DE)

(*) Notice: Subject to any disclaimer, the term of this patent is extended or adjusted under 35 U.S.C. 154(b) by 91 days.

(21) Appl. No.: 16/766,571

(22) PCT Filed: Nov. 28, 2018

(86) PCT No.: PCT/EP2018/082757
§ 371 (c)(1),
(2) Date: Dec. 15, 2020

(87) PCT Pub. No.: WO2019/105959
PCT Pub. Date: Jun. 6, 2019

(65) Prior Publication Data
US 2021/0122316 A1    Apr. 29, 2021

(30) Foreign Application Priority Data
Nov. 28, 2017 (DE) .......................... 102017128097.9

(51) Int. Cl.
*B60R 21/20* (2011.01)
*B60R 21/231* (2011.01)
(Continued)

(52) U.S. Cl.
CPC ............... *B60R 21/20* (2013.01); *B60N 2/14* (2013.01); *B60N 3/002* (2013.01); *B60R 21/207* (2013.01);
(Continued)

(58) Field of Classification Search
CPC ....... B60R 21/20; B60R 21/231; B60R 21/207; B60R 2021/23107; B60R 2021/022;
(Continued)

(56) References Cited

U.S. PATENT DOCUMENTS

| 5,730,458 A * | 3/1998 | Byon ...................... B60R 19/00 |
| | | 280/730.2 |
| 9,682,681 B1 | 6/2017 | Patel et al. |
| 2019/0106077 A1* | 4/2019 | Dry ....................... B60R 21/215 |

FOREIGN PATENT DOCUMENTS

| DE | 4217174 A1 | 11/1993 |
| DE | 112005003122 T5 | 10/2007 |

(Continued)

*Primary Examiner* — Keith J Frisby
(74) *Attorney, Agent, or Firm* — Tarolli, Sundheim, Covell & Tummino LLP

(57) ABSTRACT

The present disclosure describes a module base element for a vehicle occupant protection system comprising at least one module carrier for receiving at least one airbag module wherein the airbag module comprises at least one airbag and the airbag is connected to a gas source, especially a gas generator, and comprising a hinged arm having at least one hinged element so that the module carrier can be moved from an idle position to an operating position and from an operating position to an idle position, and comprising a lap restraint element. The present disclosure further describes a vehicle occupant protection system for protecting a vehicle occupant in a vehicle seat comprising at least one restraint element, wherein at least one restraint element of the vehicle occupant protection system is disposed in a module base element according to the present disclosure.

17 Claims, 12 Drawing Sheets

(51) Int. Cl.
  *B60R 21/207* (2006.01)
  *B60N 2/14* (2006.01)
  *B60N 3/00* (2006.01)
  B60R 21/02 (2006.01)
  B60R 21/217 (2011.01)

(52) U.S. Cl.
  CPC ...... *B60R 21/231* (2013.01); *B60R 2021/022* (2013.01); *B60R 2021/2173* (2013.01); *B60R 2021/23107* (2013.01); *B60R 2021/23146* (2013.01)

(58) Field of Classification Search
  CPC .. B60R 2021/2173; B60R 2021/23146; B60R 2021/0273; B60N 2/14; B60N 2/79; B60N 2/753; B60N 3/002; B60N 3/004
  USPC ..................................................... 280/730.1
  See application file for complete search history.

(56) References Cited

FOREIGN PATENT DOCUMENTS

| | | | | |
|---|---|---|---|---|
| DE | 102007046569 A1 | 4/2008 | | |
| DE | 202009005043 U1 | 9/2009 | | |
| DE | 102012221533 A1 * | 5/2014 | ............ | B60R 21/20 |
| DE | 102012221533 A1 | 5/2014 | | |
| DE | 102013015853 A1 | 4/2015 | | |
| DE | 102014100550 B4 | 8/2016 | | |
| DE | 102015202565 A1 * | 8/2016 | ............ | B60R 22/14 |
| DE | 102016104896 A1 | 10/2016 | | |
| DE | 102017106240 A1 | 9/2018 | | |
| WO | 9706986 A1 | 2/1997 | | |

\* cited by examiner

MODULE BASE ELEMENT FOR A VEHICLE OCCUPANT PROTECTION SYSTEM AND VEHICLE OCCUPANT PROTECTION SYSTEM

CROSS-REFERENCE TO RELATED APPLICATION

This application is a national stage of International Application No. PCT/EP2018/082757 filed Nov. 28, 2018, the disclosure of which is incorporated herein by reference in its entirety, and which claimed priority to German Patent Application No. 102017128097.9, filed Nov. 28, 2017, the disclosure of which is incorporated herein by reference in its entirety.

TECHNICAL FIELD

The present disclosure relates to a module base element for a vehicle occupant protection system.

BACKGROUND OF THE PRESENT DISCLOSURE

In automated or autonomous driving, the driver will no longer have to permanently monitor the system and, resp., the vehicle. Rather, the vehicle will automatically perform functions such as indicating, changing lanes and keeping the lane. This enables the driver to adopt a position comfortable to him/her at any seat adjustment within the scope of a predetermined seat adjustment field.

Moreover, new vehicle concepts permit new interior designs which include new steering wheel concepts or new vehicle seat concepts, for example. Vehicle concepts are known, for example, in which the vehicle seat of the front passenger or vehicle seats of rear passengers is/are arranged to be rotatable about a vertical axis in the vehicle interior. Moreover, for a vehicle driving autonomously or automatically there may be the option that even the driver can rotate his/her seat about a vertical axis.

It is one result of the afore-described changes that the occupant protection concept of a vehicle can no longer be developed, as today, for particular standard positions of the vehicle seats, but that the vehicle occupants are given more degrees of freedom as regards their occupation and positions in the vehicle interior. Especially, a seat position which is definitely beyond a range of a previous standard position of the vehicle seat may be resulting therefrom. As a consequence, the positions of the vehicle occupants relative to the safety systems usually tightly mounted on the vehicle structure, such as seat belts and airbags, are variable during traveling and, as compared to the standard position range, the distances may be significantly increased depending on the situation. Furthermore, the relative position of the vehicle occupants may deviate such that the vehicle occupant is beyond the sphere of action of the safety systems installed on the vehicle structure.

Known solutions for solving these problems are, for example, airbags having increased volumes or having adaptations by vents designed to be switchable, where appropriate, or switched tethers. However, an increase in the inflatable airbag systems is limited by various factors. For example, increased airbag volumes or spheres of action entail longer periods for reaching the active position of the airbags. In addition, even in the case of an airbag system tightly installed in the vehicle structure and having a modified airbag geometry, relative positions of the vehicle occupant might occur, such as with a vehicle seat rotated about the vertical axis, in which the vehicle occupant is located beyond the sphere of action of the airbag system installed on the vehicle structure.

In the field of the seat belts, seat-integrated seat belt systems are known which entail advantages concerning a deviation from the standard position in a longitudinal vehicle direction. In a reclining position of the vehicle seat, however, even such seat-integrated belt system is not capable of safely ensuring at any rate that the vehicle occupant will not slide forward beneath the lap belt (so-called submarining).

SUMMARY

It is the object of the present disclosure to provide an element for a vehicle occupant protection system by which, irrespective of a vehicle seat position, in a situation of restraint sufficient protection can be guaranteed for the vehicle occupant, wherein especially in a reclining position sufficient protection is to be ensured by said element. It is a further object of the present disclosure that such element is functional and can be easily used.

Moreover, it is an object of the present disclosure to provide a vehicle occupant protection system which is capable of ensuring sufficient protection for the vehicle occupant in a situation of restraint irrespective of a vehicle seat position.

A module base element for a vehicle occupant protection system according to the present disclosure comprises at least one module carrier for receiving at least one airbag module. The airbag module comprises at least one airbag connected to a gas source. The gas source may be a gas generator, for example. Alternatively, the gas source may as well be a central gas supply unit that is operatively connected to further airbags. Such gas supply unit can preferably be used for filling plural airbags in a situation of restraint. For example, such gas supply unit may be arranged even outside the module base element, with the airbag disposed in the module base element being connected to the gas supply unit by a connecting line.

Moreover, the module base element according to the present disclosure comprises a hinged bracket including at least one hinged element. Via the hinged bracket including the hinged element, the module carrier can be moved, especially swiveled, from an idle position to an operating position and from the operating position to the idle position.

The module base element according to the present disclosure further comprises a lap restraint element. The lap restraint element is disposed in or on the module carrier of the module base element in a typical embodiment. The lap restraint element prevents or at least strongly minimizes, in a situation of restraint, a movement of the pelvis of the vehicle occupant. In this way, the vehicle occupant can be prevented from submarining beneath the belt in a situation of restraint. Alternatively, the vehicle occupant can be prevented, for example, from submarining beneath the module carrier of the module base element.

In a situation of restraint, the lap restraint element can move and/or extend downward, especially in the direction of the vehicle occupant's thighs. Alternatively, or additionally, in the situation of restraint, the lap restraint element can move and/or extend diagonally downward, especially in the direction of a vehicle occupant's pelvic region. As an alternative to, or additionally to the extension/movement downward and/or diagonally downward, the lap restraint element can move and/or extend, in a situation of restraint, rearward, especially in the direction of the region of a vehicle occupant's abdomen. The lap restraint element is preferably arranged in the area of a lower side and/or a rear side of the module carrier. As an alternative, the lower side and/or the rear side of the module carrier can form the lap restraint element.

In an especially preferred embodiment, the module base element further comprises a torso and head restraint element which is adapted to restrict a movement of the torso and of the head of a vehicle occupant and thus also accelerating forces acting on the torso and the head. In a preferred embodiment, the torso and head restraint element is formed by an airbag module comprising a front airbag.

In one embodiment, the idle position helps to describe a position of the module carrier in which the module base element is not in use. In such a position, the module carrier of the module base element mounted in a vehicle is arranged next to the vehicle seat, for example. In a preferred embodiment, in the idle position the module carrier is accommodated in the center console and/or forms part of the center console or is arranged as a center console between two vehicle seats. The hinged bracket and the hinge of the module base element may be configured so that, in the idle position, in the center console preferably the rear side or the upper side of the module base element is directed upward.

Furthermore, in the idle position the module base element can be arranged or accommodated in the instrument panel. Preferably, in such embodiment, the module base element is arranged in the instrument panel in the idle position so that the upper side faces the vehicle occupant.

Further, in the idle position a module base element can be arranged or accommodated within and/or beneath a vehicle seat which is arranged in the seat row in front of the vehicle seat to which the module base element is assigned.

Alternatively, the idle position describes a position of the module carrier in which the module base element is arranged remote from the vehicle seat such that a vehicle occupant can take a seat in the vehicle seat or can arise from the vehicle seat.

The operating position helps to describe a position of the module carrier in which the module base element is used. In such position the module carrier is arranged in front of the vehicle occupant. The module carrier is preferably arranged in front of the vehicle occupant such that the lower side of the module carrier is located above the thighs. The rear side of the module carrier facing the vehicle occupant in the operating position is preferably located in front of the vehicle occupant's abdomen. The transition area from the lower outside to the rear side of the module carrier facing the vehicle occupant is preferably arranged diagonally above the pelvis of the vehicle occupant.

In one embodiment, the module base element is arranged on the vehicle seat. Especially, a module base element according to the present disclosure is assigned to a vehicle seat. The module base element can be configured particularly in such way that it is not arranged in the vehicle seat or a structural part which is preassembled as a subassembly together with the vehicle seat, but can be mounted independently of the vehicle seat. Preferably, a respective module base element is assigned to several, for example to all vehicle seats within a vehicle.

In a preferred embodiment, the lap restraint element is formed by an airbag module comprising a lap restraint airbag. Preferably, the module base element moreover comprises another airbag module including a front airbag. In another embodiment, a single airbag module comprises both the lap restraint airbag and the front airbag.

The lap restraint airbag extends in a deployed and gas-filled condition from the module carrier to the pelvic region of the vehicle occupant. Alternatively, or additionally, the lap restraint airbag extends, in the deployed and gas-filled condition, from the module carrier toward the thighs. Further, the lap restraint airbag can extend, in a deployed and gas-filled condition, to a region of the abdomen of the vehicle occupant. Thus, especially a forward movement of the pelvis of the vehicle occupant can be prevented or at least strongly minimized. Consequently, in a situation of restraint, on the one hand the vehicle occupant can be prevented from submarining beneath the belt and/or beneath the module carrier. On the other hand, it can be achieved that the vehicle occupant participates earlier in the overall deceleration of the vehicle.

In one embodiment, the airbag module of the lap restraint airbag or the module carrier comprises predetermined breaking points so that, in a situation of restraint, the lap restraint airbag can leave the module carrier and, resp., the airbag module and can deploy. In another embodiment, the module carrier or the airbag module with the lap restraint element is configured in such way that the lap restraint airbag is filled with gas inside an extensible envelope of the module carrier or of the airbag module and thus does not leave the module carrier. In this case, the module carrier is enlarged toward the pelvic region of the vehicle occupant by filling the lap restraint airbag.

Alternatively, the lap restraint element may be in the form of or may comprise a lap restraint body. The lap restraint body is configured and supported in the module carrier or the lap restraint element so that it can be moved toward the pelvis and, resp., to the pelvic region of the vehicle occupant in a situation of restraint. As an alternative, the module carrier itself can form the lap restraint body and can be moved toward the vehicle occupant in a situation of restraint. The effect resulting therefrom is equal to that described in detail before concerning the lap restraint airbag. To this end, the lap restraint body may be operatively connected, for example, to an airbag integrated in the module carrier or to a tensioning unit integrated in the module base element. The tensioning unit may be integrated and/or disposed at least partly in the hinged bracket of the module base element.

The front airbag in the form of a torso and head restraint element extends in a deployed and filled condition from the module carrier upward so that a movement of the head and the torso of the vehicle occupant can be limited. Preferably, the front airbag module is arranged in the module carrier in the area of the rear side facing the vehicle occupant and/or the upper side of the module carrier. Preferably, the front airbag module is arranged in the module carrier so that the front airbag can rest on/at an outer face of the module carrier in the deployed and filled condition. The front airbag can be designed as an airbag having one or more chambers, wherein the individual chambers can be formed by partitions and/or separating seams integrated in the airbag and/or by separate interconnected gas cushions.

For activating the airbag module and/or the lap restraint element, the module base element preferably comprises a control element. The control element may be, for example, in the form of an interface unit via which the different restraint elements of the module base element can be coupled to a controller of the vehicle occupant protection system and/or of a vehicle control system.

Alternatively, the control element can be a separate controller disposed in the module base element, especially a separate control device. Such separate controller may comprise its own sensor elements for determining a situation of restraint. Alternatively, or additionally, such separate controller can detect the required data for determining a restraint situation of further sensor elements of the vehicle, especially of a vehicle occupant protection system of the vehicle. For this purpose, the separate controller of the control element can be coupled to said sensor elements via an interface unit.

In a preferred embodiment, the restraint elements of the module base element, especially the lap restraint element and/or the torso and head restraint element, are activated by the control element only when the module carrier is in the operating position.

Further, the module base element may comprise a central airbag module which can be activated only when the module carrier is in the idle position. Such central airbag module preferably comprises a lateral airbag on the far side which helps to prevent, for example in the case of side impact or an oblique frontal impact, the vehicle occupant from overshooting beyond his/her seat or from colliding with structural parts of the vehicle interior or another vehicle occupant.

In another embodiment, the front airbag module is configured so that in the idle position of the module carrier the front airbag can take over the function of the lateral airbag on the far side.

Especially in such embodiment, the front airbag may include, for example, a torso gas cushion and a head gas cushion. The torso gas cushion and the head gas cushion may form separately inflatable cushions which are fastened to each other in a connecting area and are in fluid communication. The head gas cushion is preferably fastened in an upper end area on a side of the torso gas cushion close to the vehicle occupant. In this way, an airbag is formed in which the head gas cushion is connected to the torso gas cushion in the vertical vehicle direction as an element extending the torso gas cushion upward and toward the vehicle occupant. The upper end area of the side of the torso gas cushion close to the vehicle occupant preferably describes the upper 40% of the longitudinal extension of the torso gas cushion in the vertical vehicle direction. Equally, the lateral airbag on the far side of a separate central airbag module can be structured as afore described. Alternatively, and/or additionally, the front airbag and/or the lateral airbag on the far side can be brought into and maintained in position via appropriate means such as tethers disposed in or at the airbag. Tethers of this type can be designed to be actively controllable.

Preferably, the module carrier is equally in the form of a restraint element. The module carrier in such embodiment is in the form of a rebound element and at least partially has an energy-absorbing structure or at least partially consists of energy-absorbing material.

In a preferred embodiment, the module carrier comprises a user interface. The user interface can be a control panel and/or a screen, especially a touch display. The user interface may be, for example, a touch display disposed in the upper side of the module carrier. In one embodiment, the display of the user interface can be provided to form at least partially the module cover of the front airbag module. Such airbag unit including an airbag module whose airbag module cover comprises a display is detailed in DE 10 2017 106 240 A1, the content of which is included hereby in the present application. Alternatively, or additionally, the module carrier can comprise a terminal or an interface for electronic mobile devices such as notebooks, tablet computers and/or smart phones. The user interface is preferably coupled to the vehicle control system so that various vehicle functions can be controlled via the user interface.

The user interfaces integrated in the module carrier can be designed to be capable of cloud-computing, for example. This enables the user interfaces to communicate with a user equipment of the vehicle occupant or else any other network, for example. Thus, the vehicle occupant can e.g. work and/or access a network via the user interfaces, especially when the module carrier is in the operating position.

The module carrier of the module base element in a typical example embodiment is mechanically, electromechanically and/or electrically adjustable, especially pivotable, via a module carrier adjusting mechanism.

The module carrier adjusting mechanism can help to adjust the module carrier especially from the idle position to the operating position and from the operating position to the idle position. In addition, in the operating position, the position of the module carrier can be adapted relative to the vehicle occupant by the module carrier adjusting mechanism when the vehicle seat is adjusted.

In one embodiment, the module base element can further comprise sensor elements. The sensor elements are coupled to the module carrier adjusting mechanism so that the module carrier is automatically adjusted to the best possible operating position vis-à-vis the vehicle occupant by means of the data sensed by the sensor elements.

Preferably, the module base element further comprises a retaining element. Via the retaining element the module carrier can be locked in the operating position. Preferably, the retaining element can be additionally used also for locking the module carrier in the idle position. For this purpose, the retaining element is configured on the vehicle seat and/or the vehicle structure corresponding to a retaining element holder, for example.

The hinged bracket of the module base element preferably comprises a connection element for attaching the module base element to a vehicle structure element. The module base element can be fastened to a vehicle seat e.g. via the connection element. As an alternative, the connection element can be fastened especially also to the body of the vehicle.

The fastening of the module base element and the hinged bracket and/or the retaining element are preferably designed so that the module carrier of the module base element has the same variable degrees of freedom and the same adjusting options as a vehicle seat to which the module base element is assigned. This allows adapting the position of the module carrier relative to the vehicle occupant when the vehicle seat is adjusted.

For adapting the position via the module carrier adjusting mechanism, the hinged bracket, the retaining element and/or the retaining element holder may be telescoping elements, for example telescope bars. The adjusting mechanism of the telescoping elements can further be operatively connected to a tensioning unit, especially a pretensioner and/or a main tensioner. The pretensioner and/or the main tensioner can help to move the module carrier, especially in a situation of restraint, more closely to the vehicle occupant, especially to the region of the vehicle occupant's pelvis.

The pretensioner may comprise, for example, an electric and/or electromechanical adjusting mechanism which allows to reversibly apply the module carrier to the vehicle occupant. For example, in a possible dangerous situation (pre-crash) the module carrier can be moved by a reversible pretensioner already in advance more closely to the vehicle occupant and thus the restraint can be improved in a possible subsequent situation of restraint. Moreover, the use of such reversible pretensioner can enable the vehicle occupant to have more freedom of movement in the operating situation of the module base element and thus can enable the comfort to be increased.

The main tensioner may comprise a pyrotechnically activable adjusting mechanism, for example. The main tensioner is especially not activated before a situation of restraint is detected by the control element and/or a vehicle control system. The main tensioner is preferably activated along with an activation of the further restraint elements of the module base elements.

In another embodiment, in the retaining element holder and/or in the hinged bracket, a belt and/or rope system connected to the tensioning unit may be integrated. Accordingly, especially tensioning units can be used whose system structure of seat belt systems, for example of seat belt tensioners, end fitting tensioners and/or belt buckle tensioners, is known. Furthermore, the retaining element and the retaining element holder can be provided to be made of a belt system.

The connection element may further include an interface for coupling the control element and/or the module carrier adjusting mechanism of the module base element to the vehicle control system. Preferably, the module carrier adjusting mechanism can be connected and coupled to the vehicle seat adjusting mechanism. Coupling of the module carrier adjusting mechanism and the vehicle seat adjusting mechanism can help to achieve that, when the seat position is adjusted, the position of the module carrier is automatically equally adapted. Alternatively, adjustment of the module base element can be controlled independently of the vehicle seat adjusting mechanism via values/data of sensor elements disposed in the module base element.

Of preference, also the position of the user interfaces, especially of a display, can be automatically equally adapted to the vehicle seat position and inclination so that, apart from the preferably optimum protecting potential, the vehicle occupant can also make comfortable use of the user interfaces.

Moreover, the present disclosure comprises a vehicle occupant protection system for protecting a vehicle occupant by at least one, preferably several restraint elements. In the vehicle occupant protection system, at least one restraint element is disposed in a module base element according to the present disclosure.

In a preferred embodiment, a module base element according to the present disclosure is assigned to each vehicle seat. Alternatively, a module base element according to the present disclosure may be assigned to specific vehicle seats only. The module base element is preferred to be connected to the vehicle structure or the vehicle seat, especially the vehicle seat structure, via the connection element. Preferably, the module base element can be configured so that it is not disposed in the vehicle seat or in a structural part which is preassembled as a subassembly together with the vehicle seat, but can be mounted independently of the vehicle seat.

In a typical embodiment, the vehicle occupant protection system known from prior art comprises known restraint elements such as seat belt systems and airbag modules tightly arranged on the vehicle structure. If the vehicle seat is within the range of the standard position and the module base element is in the idle position, said restraint elements are acting as known so far. In the idle position, the module base element, especially the module carrier, is preferably arranged next to the vehicle seat. In such idle position, the module carrier may be integrated, for example, in the center console or may act as a center console.

As an alternative, the idle position describes a position in which the module carrier of the module base element is distanced from the vehicle seat and arranged so that the vehicle occupant is enabled to get into and out of the vehicle seat. For this purpose, the module carrier can be moved, e.g., from the operating position to the idle position only forward and/or backward and thus in one axial direction. Alternatively, the movement can also be effectuated in several axial directions and can further be combined with a pivoting/rotational movement.

In a preferred embodiment, the airbag module, the lap restraint element and/or the torso and head restraint element of the module base element are not activated in the idle position.

Preferably, the airbag module disposed in the module base element and/or the lap restraint element disposed in the module base element and/or the torso and head restraint element disposed in the module base element can be activated in a situation of restraint, only if the module carrier of the module base element is in the operating position. In the operating position, the module carrier is disposed in front of the vehicle occupant.

Further, in one embodiment of the vehicle occupant protection system, in the idle position of the module carrier the central airbag module can be provided to be activable so as to limit a lateral movement of the vehicle occupant by the lateral airbag on the far side in the case of a side impact or an oblique frontal impact. If the front airbag of the front airbag module is configured so that the front airbag can take over the function of the lateral airbag on the far side in the idle position of the module carrier, then the front airbag module can be provided to be activable even in the idle position.

Preferably, by controlling the vehicle occupant protection system, depending on the seat position and/or the damage event, individual restraint elements of the vehicle occupant protection system can be activated or deactivated in a situation of restraint or an adaptive controller of a restraint element can be activated. In one embodiment, the controller of the vehicle occupant protection system can additionally be coupled to the vehicle seat adjusting mechanism. Such coupling can allow for e.g. adjustment of the vehicle seat to a position beyond the standard position range only when the module carrier is in the operating position.

In one embodiment, a restraint element of the vehicle occupant protection system is a lateral airbag module comprising a lateral airbag. The lateral airbag module is preferably integrated in a side wall of the vehicle seat. There is the further option of a lateral airbag module being integrated on both sides in the seat walls. The lateral airbag module facing the vehicle center in a home position of the vehicle seat acts especially as a central airbag module. The lateral airbag module disposed toward the vehicle outside in the home position takes over the function of a lateral airbag module known from prior art and, in a position rotated about the vertical axis, can additionally take over the functions of a front airbag and/or can be utilized as an element backing the front airbag. For example, the lateral airbag in such a rotated position of the vehicle seat can guide a movement of the vehicle occupant toward the front airbag of the module carrier.

In another embodiment, the size of the lateral airbag can be adaptively controlled. Due to the adaptive size, on the one hand, the lateral airbag can have the size of a conventional lateral airbag, for example when the vehicle seat is not in a position rotated about the vertical axis. On the other hand, the volume and thus the size of the lateral airbag can be increased by the adaptive adjustment, for example when the vehicle seat is in a position rotated about the vertical axis. By increasing the adaptive lateral airbag, in such a seat position the lateral airbag can at least partially take over the function of the front airbag and, resp., back the front airbag in the event of frontal impact.

In order to further improve the function of the lateral airbag in such situation of restraint, another restraint element can be configured as a backup airbag module including a backup airbag. The backup airbag module can be arranged, for example, in the A pillar (driver and front passenger) or in the B pillar (vehicle rear occupants) of the vehicle in which the vehicle occupant protection system is integrated.

For example, the backup airbag can act as a backup element for the lateral airbag, when the vehicle seat is rotated about the vertical axis and the lateral airbag at least partially takes over the functions of the front airbag. The backup airbag helps to prevent or at least minimize bending away of the lateral airbag. Preferably, the backup airbag can additionally act as a backup element for the front airbag in the event of an oblique frontal impact.

The front airbag disposed in the module carrier of the module base element in one embodiment comprises side member extensions. In a deployed and filled condition, the side member extensions extend on both sides of the front airbag toward the vehicle occupant. The side member extensions of the front airbag can be adaptively controllable. Such side member extensions can help to further improve the vehicle occupant protection in an oblique frontal crash, for example. The lateral airbag of the vehicle occupant protection system preferably acts as a stabilizing element for the side member extensions of the front airbag.

Moreover, the vehicle occupant protection system may include a seat ramp airbag module disposed in the seat cushion. The seat ramp airbag module comprises a seat ramp airbag by which the seat cushion can be lifted at least in a front area. This helps to additionally limit a forward movement of the vehicle occupant's pelvis in a situation of restraint, especially in the comfort position.

In addition, the present disclosure intends to protect a vehicle seat, especially a vehicle for an autonomously or automatically driving vehicle, which includes a module base element according to the present disclosure and/or is coupled to a module base element according to the present disclosure. Preferably, the vehicle seat moreover includes a retaining element holder for holding the retaining element and locking the module carrier of the module base element.

In one embodiment in which the idle position describes a position of the module base element in which the module carrier is moved merely for the vehicle occupant getting in and out, the module base element is preferably tightly disposed on the vehicle seat.

If the module carrier of the module base element according to the present disclosure is arranged in the operating position, it is possible that even without any seat belt sufficient protection can be achieved for the vehicle occupant. In such embodiment, the protecting and restraining functions of a seat belt system are adopted by the module carrier and the restraint elements disposed therein as well as by the further restraint elements of a vehicle occupant protection system according to the present disclosure, where necessary.

For a vehicle seat having such module base element and/or such vehicle occupant protection system, additional degrees of freedom regarding design and construction can result from the drop of the seat belt system, as the vehicle seat structure would not have to bear the loads of the seat belt system. For example, such vehicle seat could have a lighter and more delicate design, e.g. when the connection element and/or the retaining element holder for the module base element of the vehicle occupant protection system are directly connected to the vehicle structure or an anchor element for connecting the vehicle seat to the vehicle structure.

BRIEF DESCRIPTION OF THE DRAWINGS

Further advantages, features and details of the present disclosure will be evident from the following description of an example embodiment which is not intended to be limiting, as well as from the drawings, wherein

FIG. 5 *b*) shows a second schematic side view of a vehicle seat comprising the module base element according to the present disclosure in a comfort position;

FIG. 6 *b*) shows a second schematic side view of the vehicle seat according to FIG. 5, comprising a lap restraint element and an airbag module in the activated condition;

DETAILED DESCRIPTION

Figure 1:
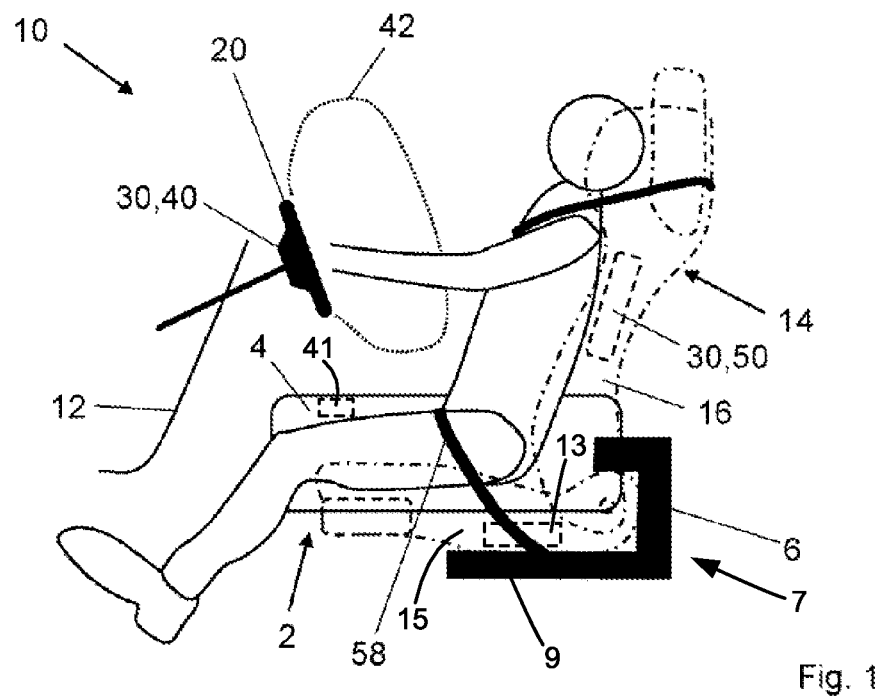
FIG. 1 shows a schematic side view of a cutout of a vehicle interior comprising a module base element according to the present disclosure in an idle position.
Figure 2:
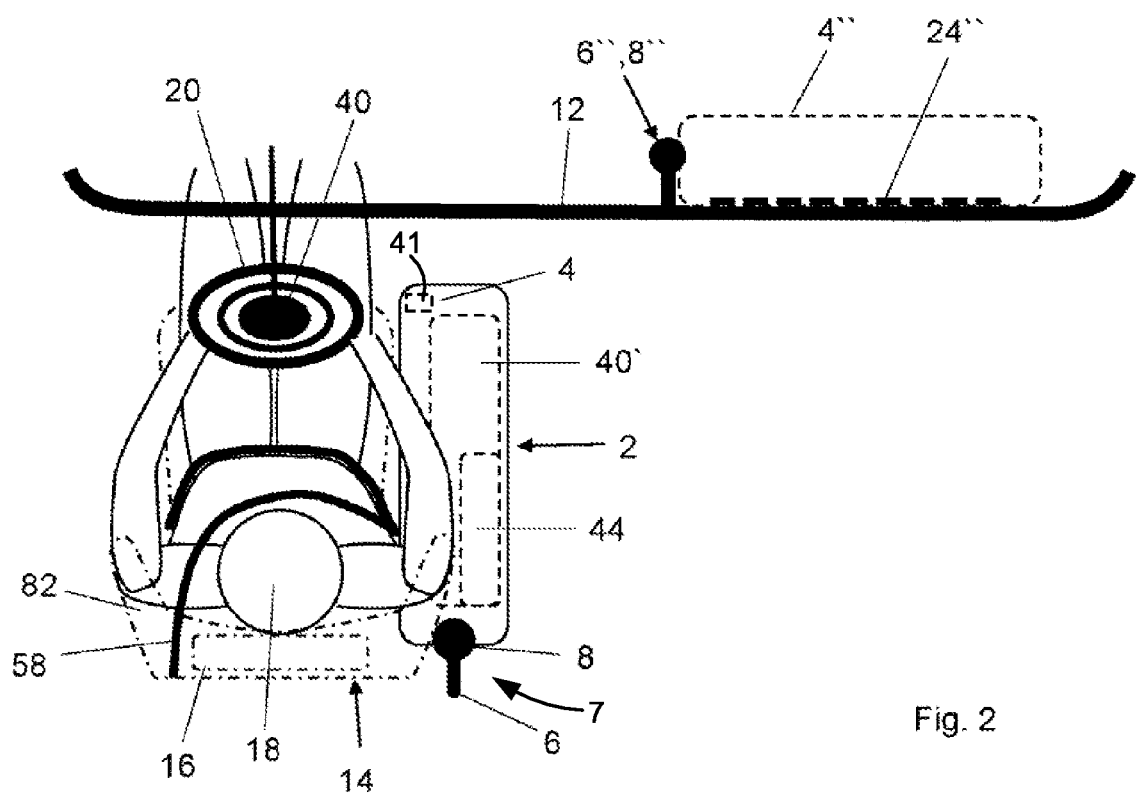
FIG. 2 shows a schematic top view onto the cutout of the vehicle interior according to FIG. 1.

FIGS. 1 and 2 illustrate a cutout of a vehicle interior comprising an embodiment of a module base element 2 according to the present disclosure of a vehicle occupant protection system 10 according to the present disclosure. FIGS. 1 and 2 show a front vehicle seat 14 with a vehicle occupant 18 in a manual driving mode in which the vehicle occupant 18 him-/herself steers the vehicle. The contour of the vehicle seat 14 is a dash-dot line for better representation of the module base element 2. A module base element 2 according to the present disclosure may also be assigned to a passenger vehicle seat or a rear vehicle seat, as a matter of course (see FIG. 11).

In FIGS. 1 and 2, the module carrier 4 of the module base element 2 is shown in an idle position. In the shown embodiment, in the idle position the module carrier 4 is arranged next to the vehicle seat 14 and constitutes the center console of the vehicle.

The module base element 2 further comprises a hinged bracket 6 including hinged elements 8. The hinged bracket 6 is attached to the vehicle structure 15, here to the vehicle seat 14, via a connection element 9. The module carrier 4 can be moved, by the hinged bracket 6, to an operating position shown in FIGS. 3 and 4 and returned therefrom. Swiveling the module carrier 4 from the idle position to the operating position and back again can be carried out especially mechanically, electromechanically or electrically via a module carrier adjusting mechanism 7. For this purpose, in the hinged bracket 6 and the hinged elements 8 servo motors are arranged, for example. In order to facilitate exact positional adjustment of the module carrier 4, the hinged bracket 6 or a segment of the hinged bracket 6 can be telescopic.

Figure 3:
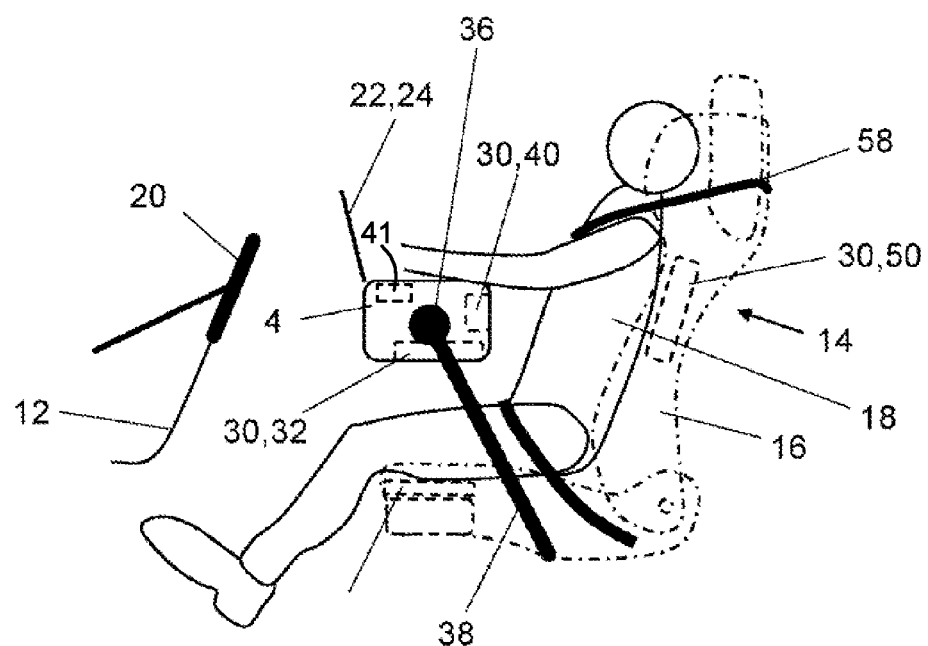
FIG. 3 shows a schematic side view of the cutout of the vehicle interior comprising the module base element according to the present disclosure in an operating position.

The illustrated module base element 2 comprises plural airbag modules 30 arranged within the module carrier 4. It is evident from FIG. 2 that in the module carrier 4 a central airbag module 44 is arranged. Furthermore, FIG. 3 illustrates that in the shown module carrier 4 a front airbag module 40 and a lap restraint airbag module 32 are arranged.

The lap restraint airbag module 32 comprises a lap restraint element 28 in the form of a lap restraint airbag 34 (cf. FIG. 6) which prevents or at least limits movement of the pelvis or the pelvic region of the vehicle occupant 18 in a situation of restraint.

The front airbag module 40 comprises a torso and head restraint element in the form of a front airbag 46 (cf. FIG. 6) which is capable of limiting a movement of the torso and/or the head of the vehicle occupant 18 in a situation of restraint.

FIG. 1 further illustrates that the vehicle occupant protection system 10 includes a lateral airbag module 50 integrated in the seat side members 82 of the seat back 16 of the vehicle seat 14. In addition, the vehicle occupant protection system 10 comprises a belt system 58 integrated in the vehicle seat 14. Further, in FIG. 1 a front airbag module 40 integrated in the steering wheel 20 and including a front airbag 42 is shown.

In the manual driving operation as shown in FIGS. 1 and 2 in which the module carrier 4 is in the idle position, the front airbag module 40 disposed in the module carrier 4 and the lap restraint airbag module 32 are deactivated. The central airbag module 44 can be activated in this position by the control element 41 of the module base element.

In an alternative embodiment, in the module carrier 4 a front airbag module 40' can be arranged whose front airbag is designed so that in the idle position the front airbag can adopt the function of a central airbag, especially a lateral airbag on the far side. In such embodiment, the front airbag module 40' can be activated even in the idle position of the module carrier 4 shown in FIG. 2. In addition, the front airbag module 40, 40' of the module carrier 4 may also be provided to comprise a front airbag and a central airbag which can be controlled separately from each other and thus can be separately activated and filled in response to the position of the module carrier, for example.

Moreover, in FIG. 2 an alternative idle position of a module carrier 4" including the hinged bracket 6" and the hinged elements 8" in the instrument panel 12 of the vehicle is shown. The module carrier preferably can be disposed in the instrument panel 12 so that in the idle position the upper side of the module carrier 4" is aligned with a display 24" facing the vehicle occupant.

Figure 4:
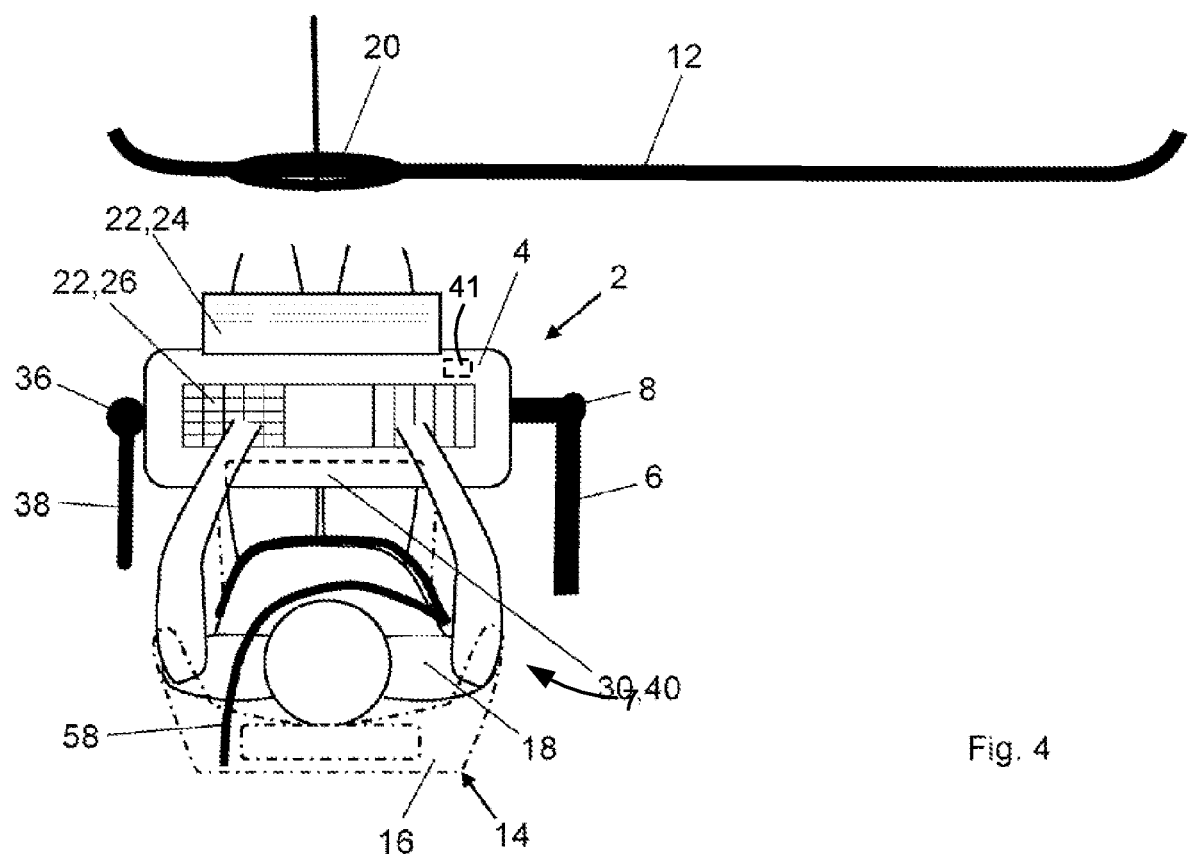
FIG. 4 shows a schematic top view onto the cutout of the vehicle interior according to FIG. 3.

In FIGS. 3 and 4, the module carrier 4 of the module base element 2 is shown in the operating position in which it is arranged in front of the vehicle occupant 18. In the shown embodiment, the vehicle is in autonomous driving operation. Accordingly, the steering wheel 20 can be retractable into the instrument panel 12, as shown in FIGS. 3 and 4. This helps to increase the comfort of the vehicle occupant 18, for example.

The module carrier 4 comprises a retaining element 36 in the shown example embodiment. The retaining element 36 is connected to a retaining element holder 38 which in turn is connected to the vehicle structure. The module carrier 4 of the module base element 2 can be additionally locked in the operating position by the retaining element 36. The retaining element 36 and the retaining element holder 38 and/or the hinged bracket 6 and the hinged elements 8 are designed, in one embodiment, such that they can transmit forces generated in a situation of restraint to the vehicle structure.

The retaining element 36 and/or the retaining element holder 38 comprise an adjusting element controllable by the module carrier adjusting mechanism 7. The module base element may further comprise sensor elements which are coupled to the control element 41 of the module base element 2 so that an operating position of the module carrier 4 which is optimally aligned with the vehicle occupant 18 is adjustable via the module carrier adjusting mechanism. 7 of the module carrier 4.

In the shown module carrier 4, furthermore different user interfaces 22 are integrated. Apart from a screen/display 24, the shown module carrier 4 comprises a control panel 26. The control panel 26 and the display 24 can be in the form of comfort elements for the vehicle occupant 18. In addition, the control panel 26 and the display 24 can be adapted to be coupled to the vehicle control system so that the vehicle occupant 18 can control and/or check various functions of the vehicle through said user interfaces 22.

If the module carrier 4 is arranged and locked in the operating position, it is possible to achieve sufficient protection for the vehicle occupant 18 without the seat belt of the belt system 58. In such an embodiment, the protecting and restraining functions of the belt system must be taken over by the module carrier 4, the restraint elements integrated in the module carrier 4 as well as the further restraint elements of the vehicle occupant protection system 10.

Figure 5:
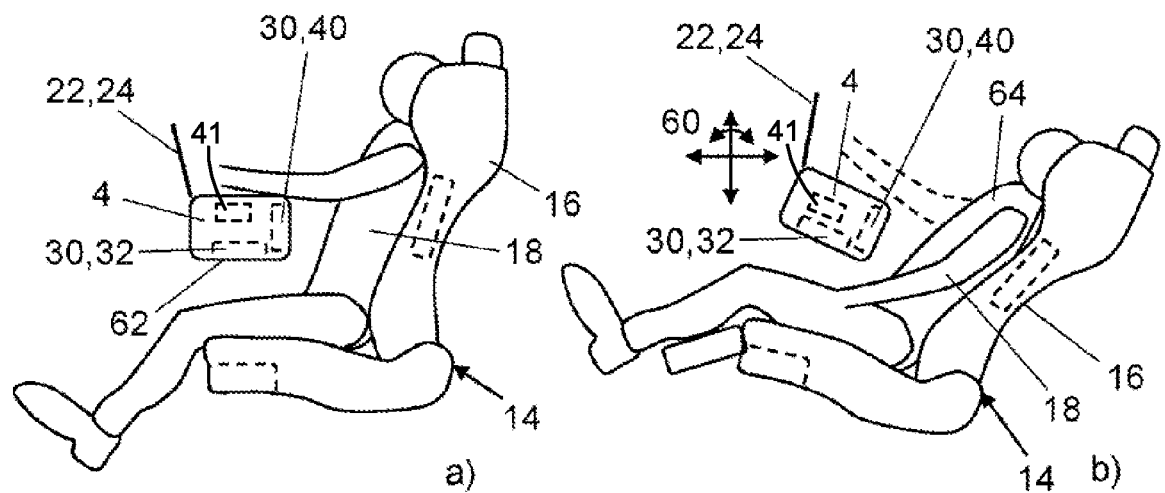
FIG. 5 *a*) shows a first schematic side view of a vehicle seat comprising the module base element according to the present disclosure in a standard position.

FIGS. 5 a) and b) schematically illustrate the vehicle seat 14 with the vehicle occupant 18 and the module carrier 4. On the one hand, FIG. 5 a) shows the vehicle seat 14 with the vehicle occupant 18 and the module carrier 4 in a substantially upright seat position. On the other hand, FIG. 5 b) shows the vehicle seat 14 with the vehicle occupant 18 and the module carrier 4 in a comfort position. In the shown comfort position, the vehicle occupant 18 and the vehicle seat 14 are in a reclining position in which the seat back 16 is inclined backwards.

The module carrier adjusting mechanism 7 in the illustrated example embodiment is coupled to the vehicle seat adjusting mechanism 13. The coupling helps to achieve, when the vehicle seat 14 is adjusted, that the position of the module carrier 4 is automatically adapted to the changed position of the vehicle seat 14 and of the vehicle occupant 18. Alternatively, the position of the module carrier 4 can be adapted by the module carrier adjusting mechanism 7 via the control element 41 by sensor data of the module base element. Accordingly, the position of the module carrier 4 is changed so that the lap restraint element 28 and/or the torso and head restraint element are aligned preferably optimally with the vehicle occupant 18. The arrows 60 exemplify possible directions of movement and rotation into which the module carrier 4 can be moved/swiveled for adapting the position.

The module carrier 4 of the module base element 2 of the shown vehicle occupant protection system 10 moreover can be a rebound element which is made at least partly from energy-absorbing material and/or has an energy-absorbing structure.

Figure 6:
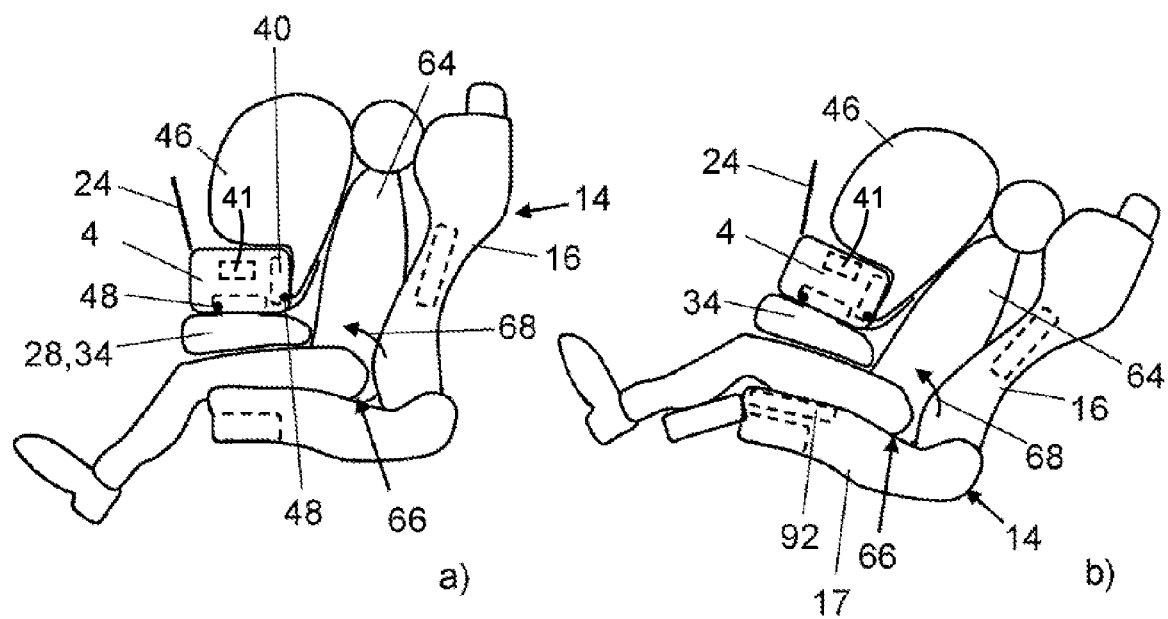
FIG. 6 *a*) shows a first schematic side view of the vehicle seat according to FIG. 5, comprising a lap restraint element and an airbag module in the activated condition.

FIGS. 6 a) and b) illustrate the vehicle seat 14 with the vehicle occupant 18 and the module carrier 4 in a situation of restraint in the upright seat position—FIG. 6a) and in the comfort position—FIG. 6b).

In the area of the lower side 62 of the module carrier 4, the lap restraint airbag module 32 is disposed. In the shown situation of restraint, the lap restraint airbag 34 helps to limit or, in the ideal case, almost prevent any forward movement of the pelvis/pelvic region 66 of the vehicle occupant 18. In this way, e.g. the risk of the vehicle occupant 18 submarining beneath the module carrier 4 and/or the lap element of the belt system not shown in FIGS. 5 and 6 can be reduced. Limiting and/or preventing the forward movement of the pelvis/pelvic region 66 can additionally be backed by a seat ramp airbag (not shown) of a seat ramp airbag module 92. The seat ramp airbag module 92 is arranged, for example, in a front area of the seat cushion 17 of the vehicle seat 14 (see FIG. 6b).

Furthermore, by limiting the lap movement it is possible to improve the course of the forward displacement of the vehicle occupant 18, as a rotation 68 of the torso 64 of the vehicle occupant 18 toward the module carrier 4 and the torso and head restraint element in the form of a front airbag 46 is generated. In the shown embodiment, both the lap restraint airbag 34 and the front airbag 46 are filled with gas by a gas generator 48 assigned to the respective airbag module 30 (lap airbag module 32 and front airbag module 40).

Figure 7:
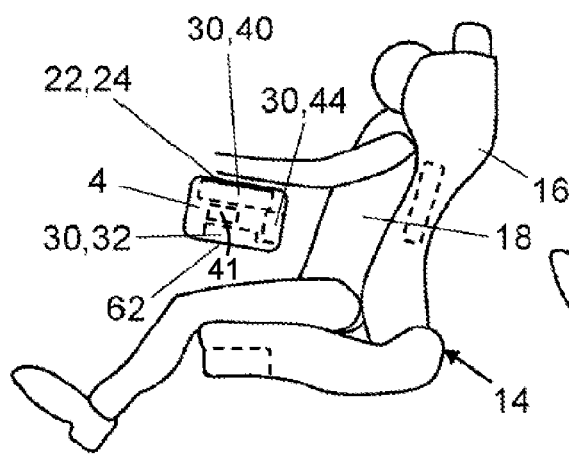
FIG. 7 shows a schematic side view of a vehicle seat with another embodiment of a module base element according to the present disclosure in a standard position.
Figure 8A:
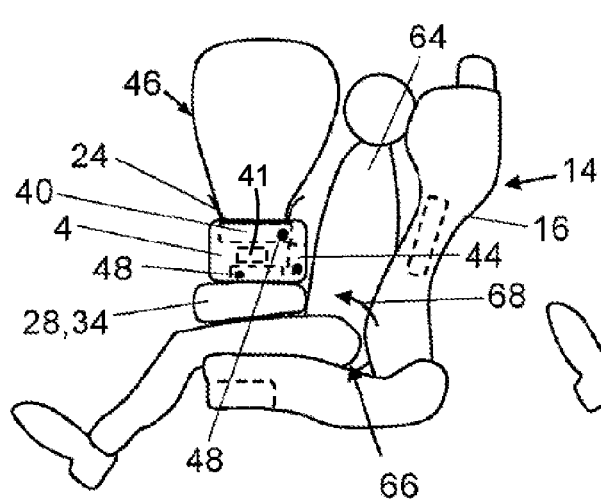
FIGS. 8*a* and 8*b* show a schematic side view of the vehicle seat according to FIG. 7, comprising a lap restraint element and alternative embodiments of an airbag module in the activated condition.
Figure 8B:
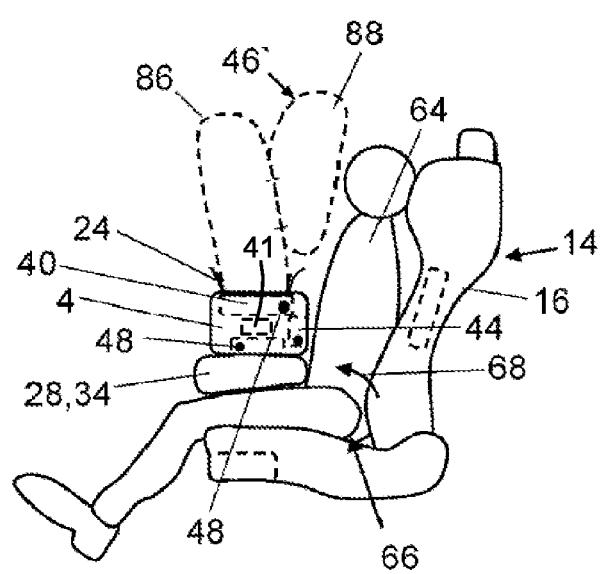

FIGS. 7, 8a, and 8b schematically illustrate the vehicle seat 14 with the vehicle occupant 18 and another embodiment of the module carrier 4 of the module base element 2.

In the module carrier 4, a lap restraint airbag module 32, a front airbag module 40 and a central airbag module 44 are arranged. The front airbag module 40 is arranged in the area of an upper side of the module carrier 4 within the module carrier. The display 24 at least partly forms the module cover of the front airbag module 40. For example, the display 24 can be configured at least partly as an OLED film. It is evident from FIGS. 8a and 8b that, in a situation of restraint, the display 24 can be destroyed by the front airbag 46, 46' so that the front airbag 46, 46' can be filled with gas by the gas generator 48 of the front airbag module 40 and can deploy. The front airbag 46' of FIG. 8b is an alternative embodiment to the front airbag 46 of FIG. 8a. The front airbag 46' of FIG. 8b includes a torso gas cushion 86 and a head gas cushion 88 which are interconnected in a connection area 90. Preferably, the torso gas cushion 86 and the head gas cushion 88 are configured so that, in the situation of restraint, the torso gas cushion 86 has a backing effect on the head gas cushion 88.

Figure 9:
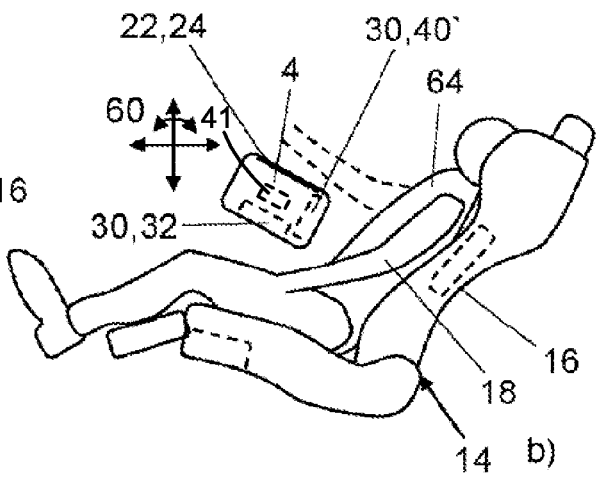
FIG. 9 shows a schematic side view of a vehicle seat with another embodiment of a module base element according to the present disclosure in a comfort position.
Figure 10:
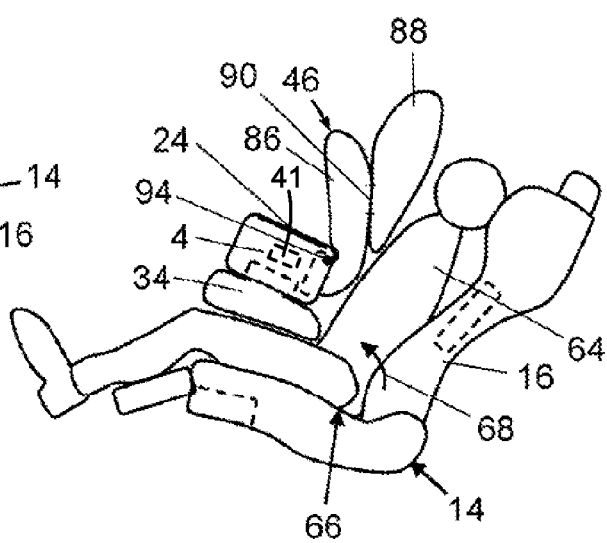
FIG. 10 shows a schematic side view of the vehicle seat according to FIG. 9, comprising a lap restraint element and an airbag module in the activated condition.

FIGS. 9 and 10 schematically illustrate the vehicle seat 14 with the vehicle occupant 18 in a comfort position and another embodiment of the module carrier 4 of the module base element 2. In contrast to the embodiment of FIGS. 7 and 8, the front airbag module 40 is arranged in the area of the rear side of the module carrier 4 rather than beneath the display 24 in the area of the upper side of the module carrier 4. In this embodiment, the front airbag 46 is formed by a torso gas cushion 86 and a head gas cushion 88. The front airbag 46 of the front airbag module 40 shown in FIGS. 9 and 10 can be designed so that the front airbag 46 can be used as a lateral airbag on the far side, if the module carrier 4 of the module base element 2 is in the idle position. For controlling the deployment direction of the front airbag in the operating position and/or the idle position of the module carrier, the front airbag module may comprise deployment control elements 94 which can be actively released. The deployment control elements may be tethers, for example, which are connected to a tether releasing device.

Figure 11:
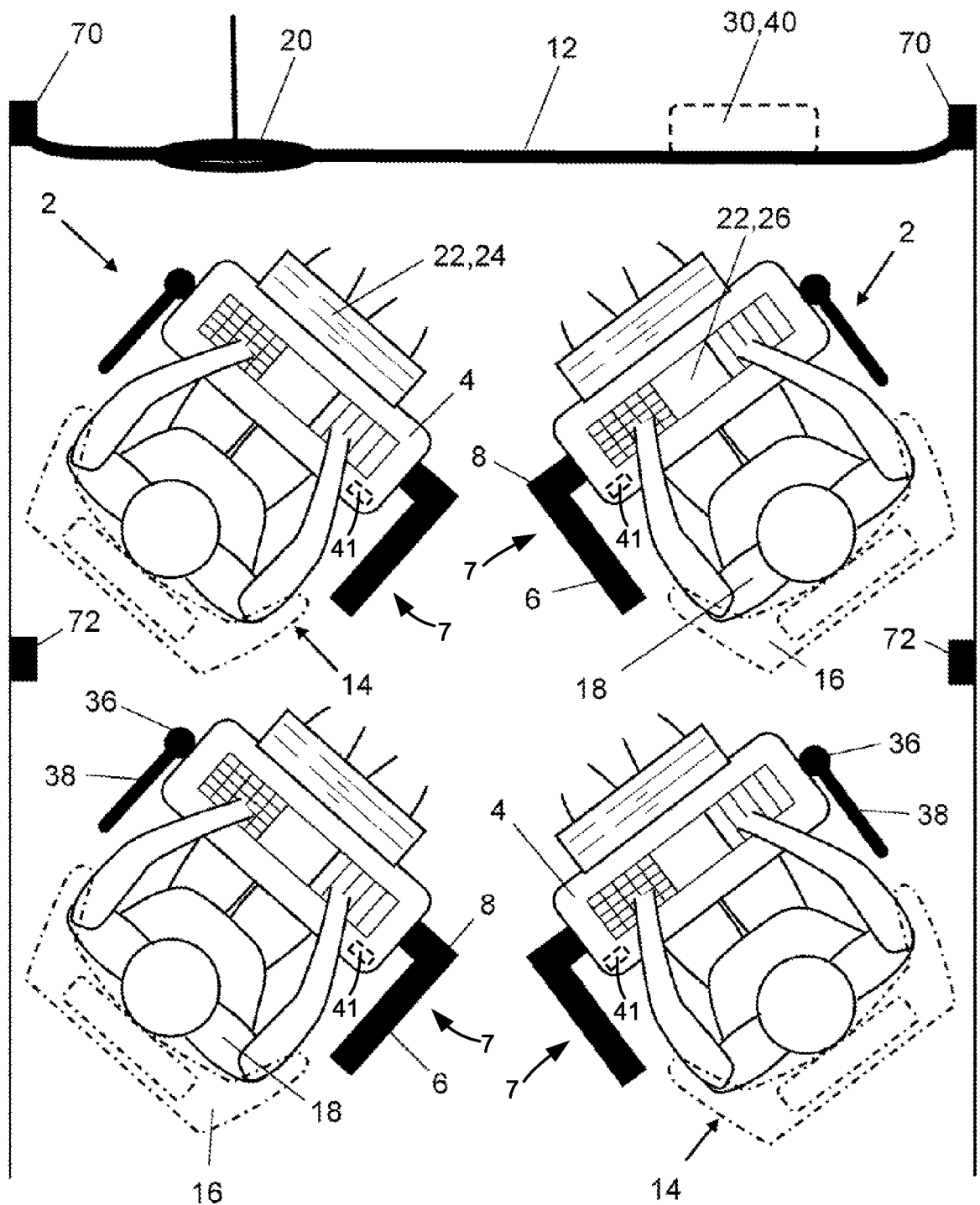
FIG. 11 shows a schematic top view onto a vehicle interior comprising an embodiment of a vehicle occupant protection system according to the present disclosure.
Figure 12:
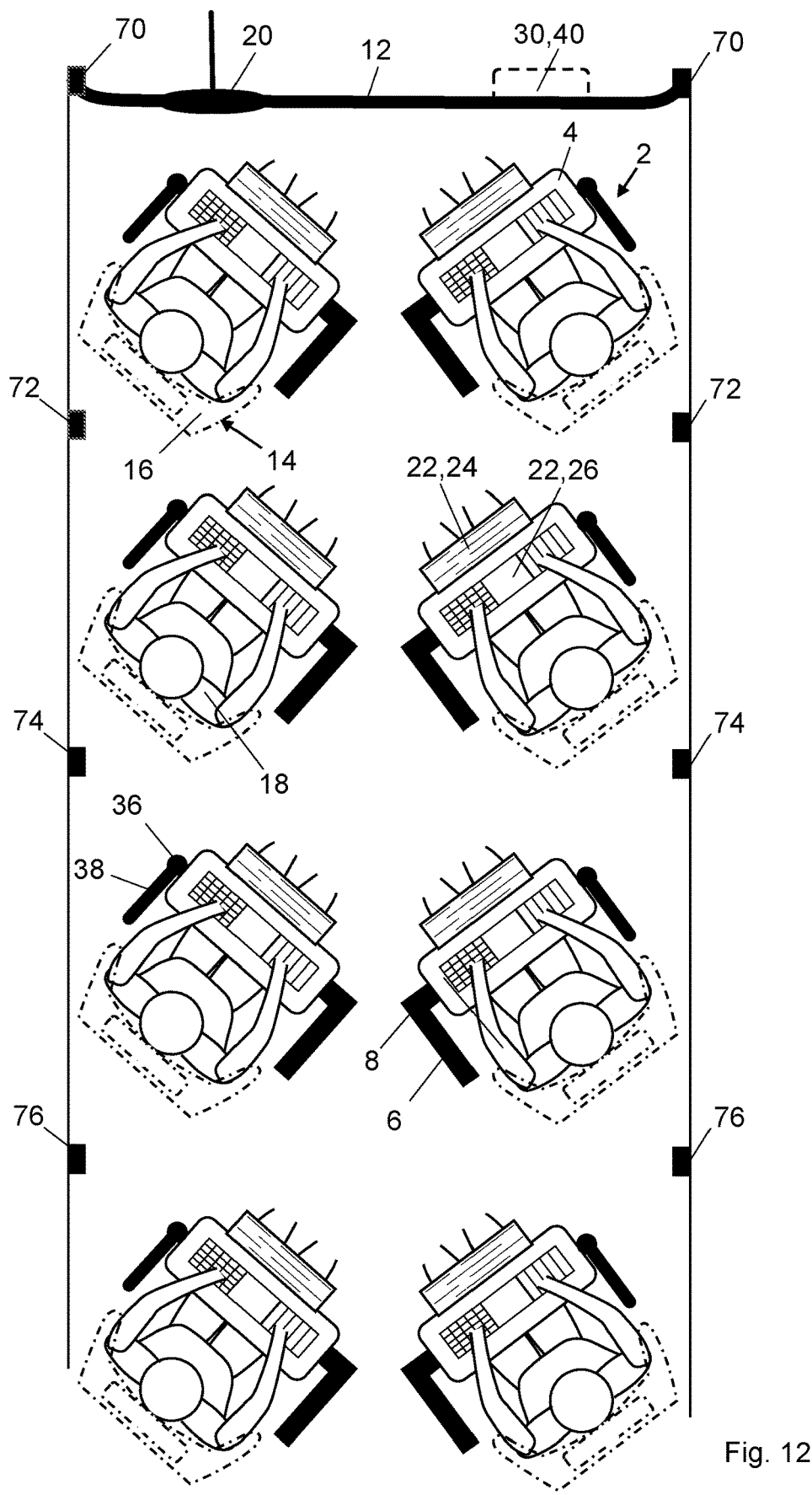
FIG. 12 shows another schematic top view onto a vehicle interior having plural seat rows comprising an embodiment of a vehicle occupant protection system according to the present disclosure.

FIG. 11 illustrates a schematic top view onto a vehicle interior in which, apart from the two front vehicle seats 14, also the two rear vehicle seats 14 comprise a module base element 2 according to the present disclosure. FIG. 12 shows a similar representation for a vehicle having plural seat rows, with a module base element according to the present disclosure being assigned to each vehicle seat 14.

In this embodiment, the vehicle occupant protection system 10 moreover comprises additional restraint elements such as front airbag modules 40 known from prior art which are arranged within the steering wheel 20 or the instrument panel 12. For example, the vehicle occupant protection system 10 may further include belt systems 58 and/or head airbag modules arranged in the area of the roof edge. Furthermore, in the shown example embodiment, restraint elements can also be arranged in the A, B, C and/or D pillars 70, 72, 74 and 76.

Figure 13:
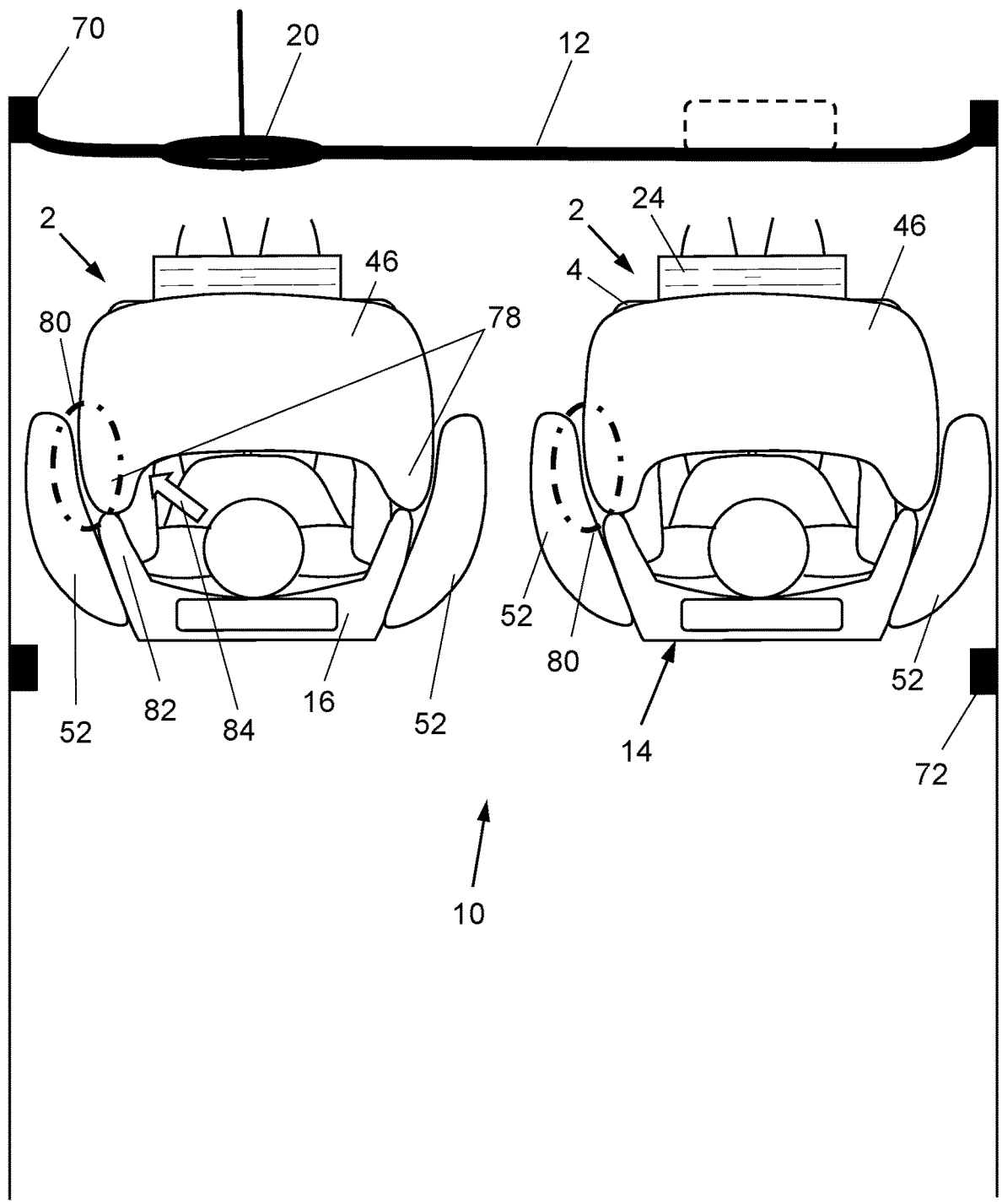
FIG. 13 shows a schematic top view onto a front seat row of a vehicle interior comprising an embodiment of a vehicle occupant protection system according to the present disclosure in the event of an oblique frontal impact.

In FIG. 13, a top view onto an embodiment of a vehicle occupant protection system 10 is shown in which the front airbags 46 comprise side member extensions 78. The side member extensions 78 extend, in the deployed and filled condition of the front airbag 46, on both sides toward the vehicle occupant 18. The side member extensions 78 can improve the protection for the vehicle occupant in a situation of restraint triggered by an oblique frontal crash by limiting the movement of the head and the torso of the vehicle occupant 18 shown here by the arrow 84. The lap restraint airbag 34 as well as the module carrier 4 of the module base element are covered by the front airbag 46.

In order to reduce the risk of the side member extension 78 of the front airbag 46 bending away, in addition the lateral airbags 52 disposed in the seat side members 82 can be activated and filled with gas. Preferably, only the lateral airbag 52 that faces the impact side is activated. The lateral airbag 52 helps to additionally stabilize the front airbag 46 in such a situation of restraint. In the event of an oblique frontal crash on the driver side, such stabilization is effectuated in the shown stabilizing areas 80.

Figure 14:
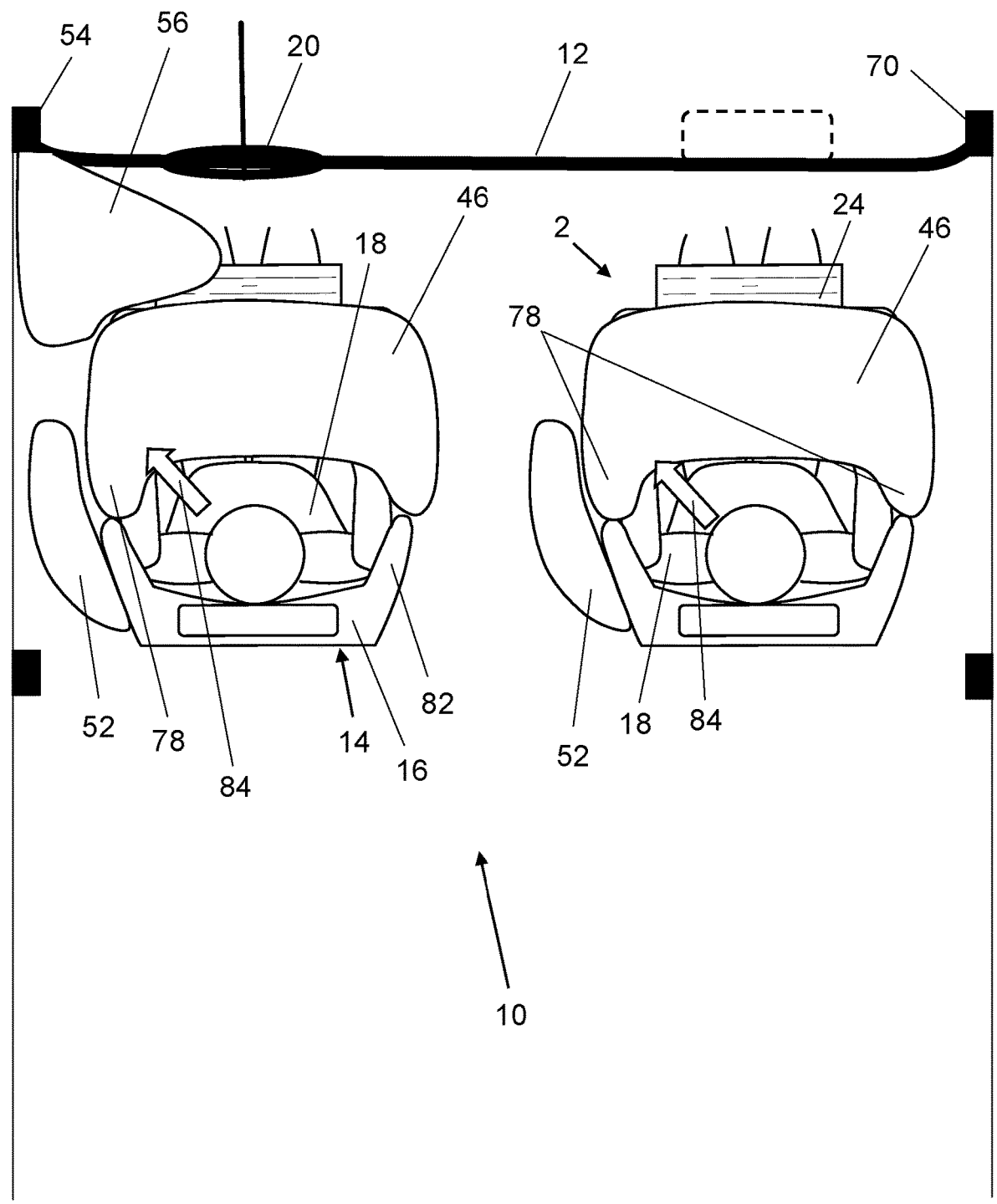
FIG. 14 shows a schematic top view onto a front seat row of a vehicle interior comprising an embodiment of a vehicle occupant protection system according to the present disclosure in the event of an oblique frontal impact.

FIG. 14 shows substantially the same situation as FIG. 13. In addition to the already described restraint elements, the vehicle occupant protection system 10 comprises a backup airbag module 54 arranged in the A pillar 70 and including a backup airbag 56. The backup airbag 56 serves as an additional backing and stabilizing element.

Moreover, in the shown embodiment, only the respective lateral airbags 52 located in the direction of movement 84 of the vehicle occupant 18 were filled with gas by the control of the vehicle occupant protection system 10.

Figure 15:
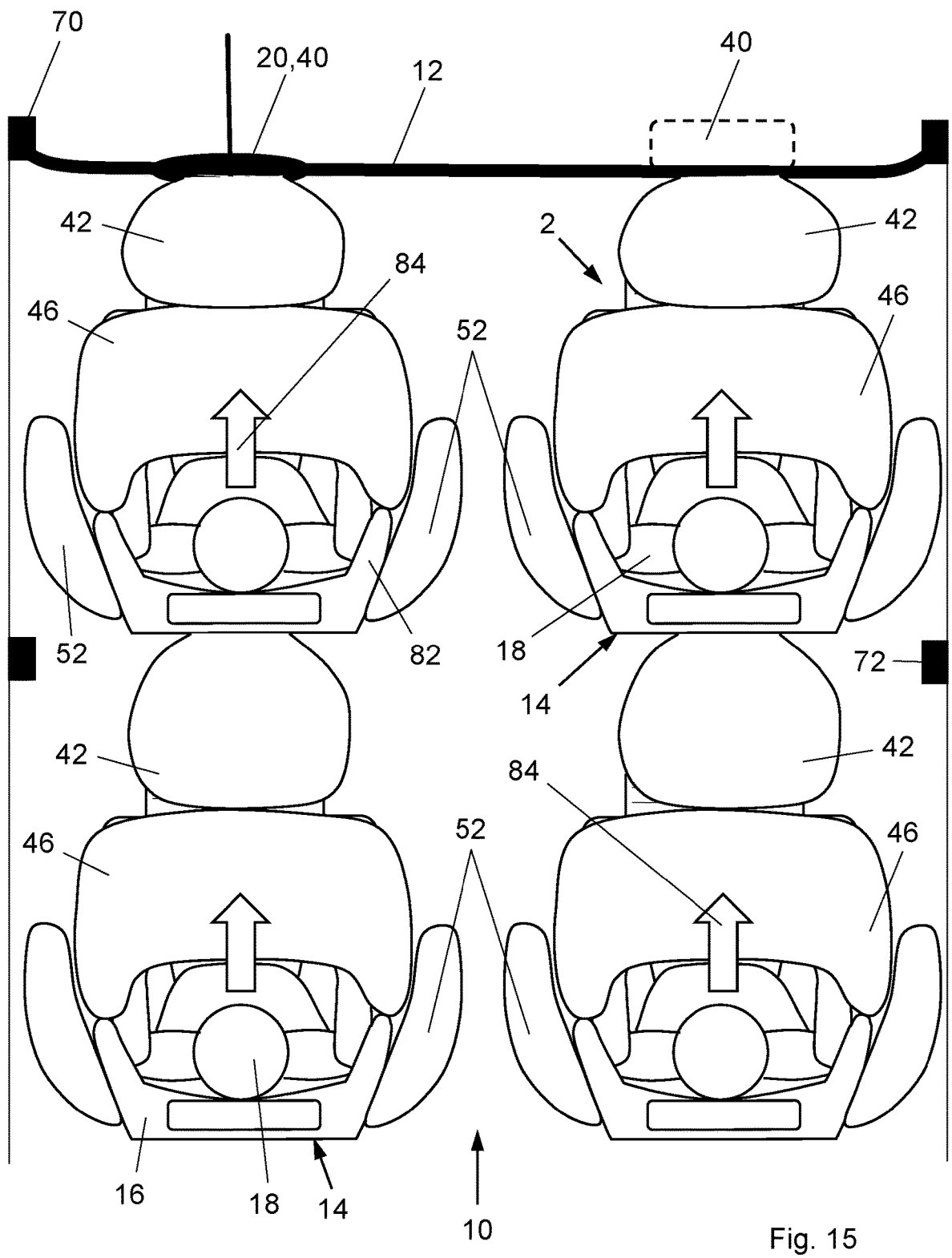
FIG. 15 shows a schematic top view onto a vehicle interior comprising an embodiment of a vehicle occupant protection system according to the present disclosure in the event of a frontal impact.

FIG. 15 shows a situation of restraint in a frontal crash. In the shown embodiment, apart from the front airbag 46 and the lap restraint airbag 34 disposed in the module carrier 4, additionally the front airbags 42 disposed in the steering wheel 20, the instrument panel 12 and the front vehicle seats 14 are filled with gas. The lateral airbags 52 disposed in the seat side members 82 are filled with gas as well.

The front airbags 42 and the lateral airbags 52 serve as backup elements for the front airbags 46. Preferably, the front airbags 42 and the lateral airbags 52 can be activated and filled with gas by a control of the vehicle occupant protection system 10 in response to a severity of the crash which triggers the situation of restraint.

Figure 16:
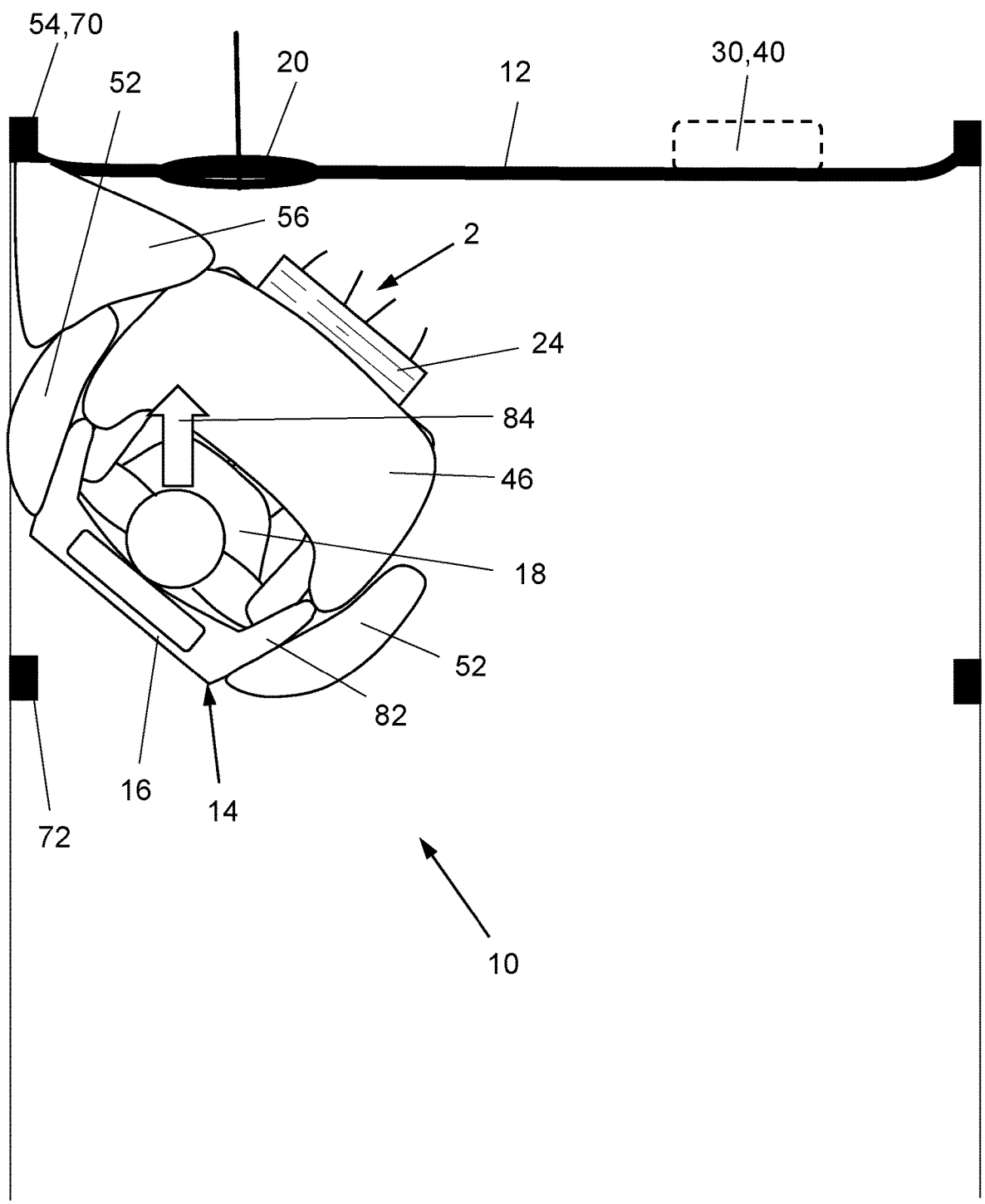
FIG. 16 shows a schematic top view onto a cutout of a vehicle interior including a vehicle seat rotated about the vertical axis comprising an embodiment of a vehicle occupant protection system according to the present disclosure in the event of a frontal impact.

In FIG. 16, a situation of restraint is shown in a frontal crash for the driver seat position in which the vehicle seat is arranged to be rotated about the vertical axis. The lateral airbag 52 and the backup airbag 56 serve as backup elements for the front airbag 46 of the module base element 2. The lateral airbag 52 can especially help to minimize the risk of the vehicle occupant 18 submarining between the seat side member 82 and the front airbag 46. The backup airbag 56 can additionally reduce the risk of the front airbag bending away.

Figure 17:
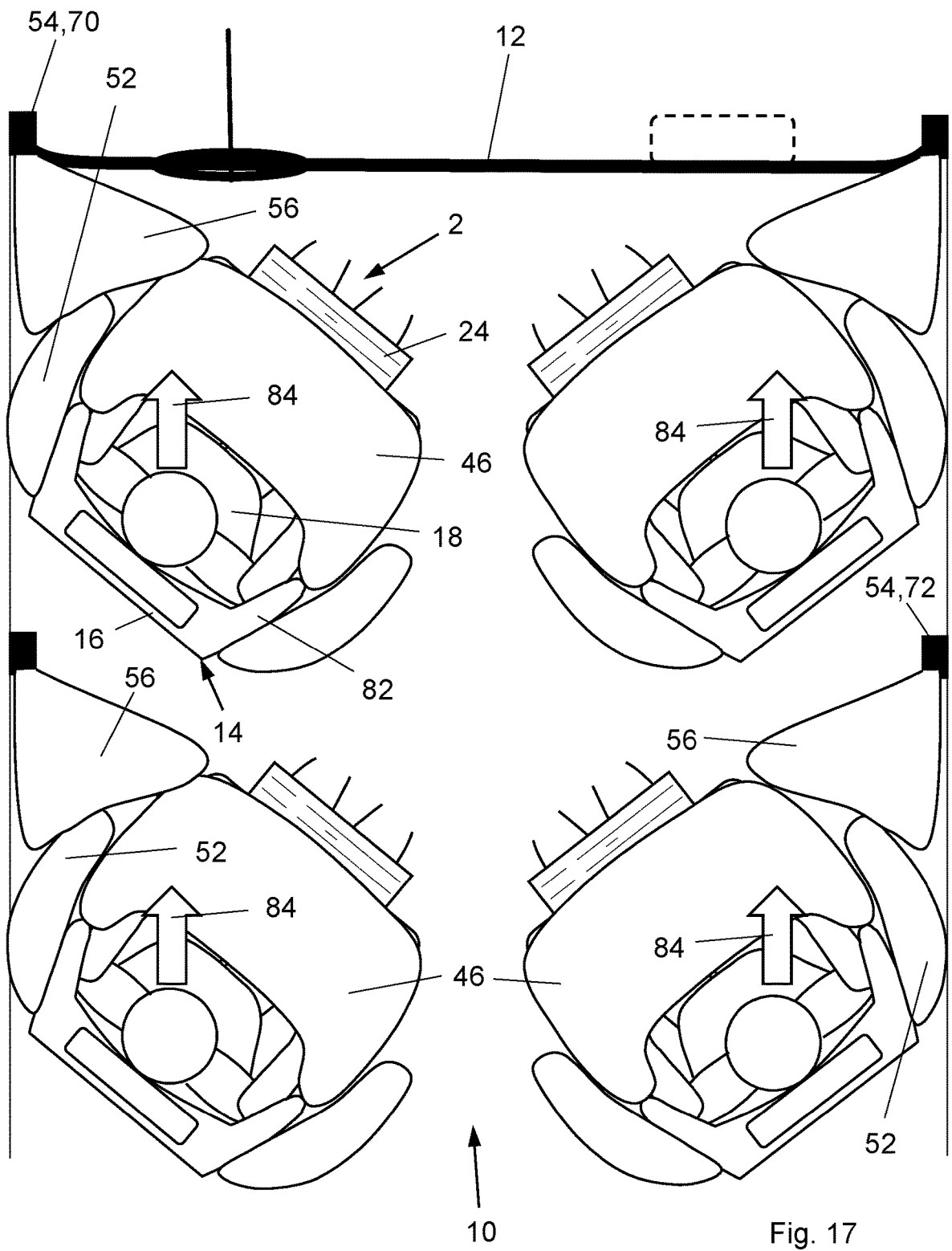
FIG. 17 shows a schematic top view onto a vehicle interior including plural vehicle seats rotated about the vertical axis comprising a vehicle occupant protection system according to FIG. 16 in the event of a frontal impact.

FIG. 17 illustrates the same situation for a front seat row and a rear seat row. The backup airbag modules 54 including the backup airbags 56 for the rear passengers are arranged in the B pillars 72 of the vehicle.

The invention claimed is:

1. A module base element for a vehicle occupant protection system comprising:
   a module carrier for receiving at least one airbag module, wherein the at least one airbag module comprises at least one airbag connected to a gas source,
   a hinged bracket including at least one hinged element so that the module carrier can be moved from an idle position to an operating position and from the operating position to the idle position, and
   a lap restraint element,
   wherein in the idle position the at least one airbag is configured to provide side protection for the vehicle occupant, and wherein in the operating position the at least one airbag is configured to provide front protection for the vehicle occupant.

2. The module base element according to claim 1, wherein the at least one airbag comprises a torso and head restraint element.

3. The module base element according to claim 1, wherein the at least one airbag comprises a torso and head restraint element and wherein the lap restraint element comprises a lap restraint airbag.

4. The module base element according to claim 3, wherein the module carrier is in the form of a restraint element, wherein the module carrier is a rebound element comprising an energy-absorbing structure which is not formed by the airbag and the lap restraint airbag.

5. The module base element according to claim 1, wherein the lap restraint element is disposed in the module carrier.

6. The module base element according to claim 1, wherein the lap restraint element is actuatable and wherein the module base element comprises a control element configured to control the actuation of the at least one airbag and the lap restraint element.

7. The module base element according to claim 1, wherein in the idle position the at least one airbag is configured to provide side protection on an inboard side of the vehicle occupant.

8. The module base element according to claim 1, wherein the module carrier can be mechanically, electromechanically or electrically adjusted via a module carrier adjusting mechanism.

9. The module base element according to claim 8, wherein the module base element comprises a control element, and wherein the module carrier adjusting mechanism can be coupled to a vehicle seat adjusting mechanism via the control element.

10. The module base element according to claim 1, wherein the module carrier comprises a user interface comprising at least one of a control panel, a display, and an interface for an electronic mobile device.

11. The module base element according to claim 1, wherein the hinged bracket comprises a connection element for attaching the module base element to vehicle structure and/or a vehicle seat element.

12. The module base element according to claim 1, further comprising a retaining element for locking the module carrier in the operating position.

13. The module base element according to claim 1, wherein the at least one airbag module comprises a first airbag module including the at least one airbag, wherein the at least one airbag comprises a torso and head restraint element, and a second airbag module including the lap restraint element, wherein the lap restraint element comprises a lap restraint airbag.

14. A vehicle occupant protection system for protecting a vehicle occupant in a vehicle seat comprising:
   a module carrier for receiving at least one airbag module, wherein the at least one airbag module comprises at least one airbag and the at least one airbag is connected to a gas source,
   a hinged bracket including at least one hinged element so that the module carrier can be moved from an idle position to an operating position and from the operating position to the idle position, and
   a lap restraint element,
   wherein in the idle position the at least one airbag module is configured to provide side protection for the vehicle occupant, and wherein in the operating position the at least one airbag module is configured to provide front protection for the vehicle occupant.

15. The vehicle occupant protection system according to claim 14, wherein the module carrier is assigned to each vehicle seat.

16. The vehicle occupant protection system according to claim 14, wherein the module carrier is connected to vehicle structure via a connection element.

17. The vehicle occupant protection system according to claim 14, wherein a position of the module carrier relative to the vehicle seat can be adapted via at least one of the hinged bracket and a module carrier adjusting mechanism.

* * * * *